(12) United States Patent
Joshi et al.

(10) Patent No.: US 11,578,669 B2
(45) Date of Patent: Feb. 14, 2023

(54) METHOD AND SYSTEM FOR OPERATING A GAS TURBINE ENGINE

(71) Applicant: PRATT & WHITNEY CANADA CORP., Longueuil (CA)

(72) Inventors: Ninad Joshi, Brampton (CA); Sid-Ali Meslioui, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/412,698

(22) Filed: Aug. 26, 2021

(65) Prior Publication Data

US 2021/0388774 A1 Dec. 16, 2021

Related U.S. Application Data

(62) Division of application No. 15/720,425, filed on Sep. 29, 2017, now Pat. No. 11,131,252.

(51) Int. Cl.
| | |
|---|---|
| *F02C 9/52* | (2006.01) |
| *F02C 9/50* | (2006.01) |
| *F02C 6/08* | (2006.01) |
| *F02C 9/18* | (2006.01) |
| *F23R 3/26* | (2006.01) |

(52) U.S. Cl.
CPC .............. *F02C 9/50* (2013.01); *F02C 6/08* (2013.01); *F02C 9/18* (2013.01); *F02C 9/52* (2013.01); *F23R 3/26* (2013.01); *F05D 2270/03* (2013.01); *F05D 2270/08* (2013.01); *F05D 2270/14* (2013.01); *F23R 2900/00013* (2013.01)

(58) Field of Classification Search
CPC ...... F02C 9/50; F02C 9/18; F02C 9/52; F02C 6/08; F23R 3/26
See application file for complete search history.

(56) References Cited

U.S. PATENT DOCUMENTS

| | | |
|---|---|---|
| 2,812,637 A | 11/1957 | Fox |
| 4,157,010 A | 6/1979 | Sailer |
| 4,683,715 A | 8/1987 | Iizuka |
| 4,747,262 A * | 5/1988 | Maynard ................... F02C 9/26 60/39.23 |
| 4,766,721 A | 8/1988 | Iizuka |
| 5,319,919 A | 6/1994 | Nakayama |
| (Continued) | | |

*Primary Examiner* — Steven M Sutherland
(74) *Attorney, Agent, or Firm* — Norton Rose Fulbright Canada LLP

(57) ABSTRACT

A system has: a combustor; a plenum surrounding the combustor; a transfer tube having an inlet fluidly connected to the plenum and at least two outlets, a first flow passageway defined between the inlet and a first outlet, a second flow passageway defined between the inlet and a second outlet, the second flow passageway connected to a discharge region outside of the plenum; a flow valve disposed within the second flow passageway and operable between an open position and a closed position, in the open position the flow valve fluidly connects the plenum with the discharge region, in the closed position the flow valve blocking fluid communication between the plenum and the discharge region; and a controller communicatively coupled to the flow valve to control operation thereof by: causing the flow valve to open for a time period; and subsequent to the time period, causing the flow valve to close.

20 Claims, 6 Drawing Sheets

(56) References Cited

U.S. PATENT DOCUMENTS

| | | | |
|---|---|---|---|
| 6,487,863 B1* | 12/2002 | Chen | F02C 7/185 |
| | | | 60/39.12 |
| 7,272,931 B2 | 9/2007 | Held et al. | |
| 10,358,923 B2* | 7/2019 | Takata | F02C 9/28 |
| 2005/0150231 A1 | 7/2005 | Laster | |
| 2011/0056180 A1 | 3/2011 | Nomura | |
| 2011/0232288 A1 | 9/2011 | Bizouard et al. | |
| 2014/0271110 A1 | 9/2014 | Tillery | |
| 2017/0058780 A1 | 3/2017 | Kim et al. | |

\* cited by examiner

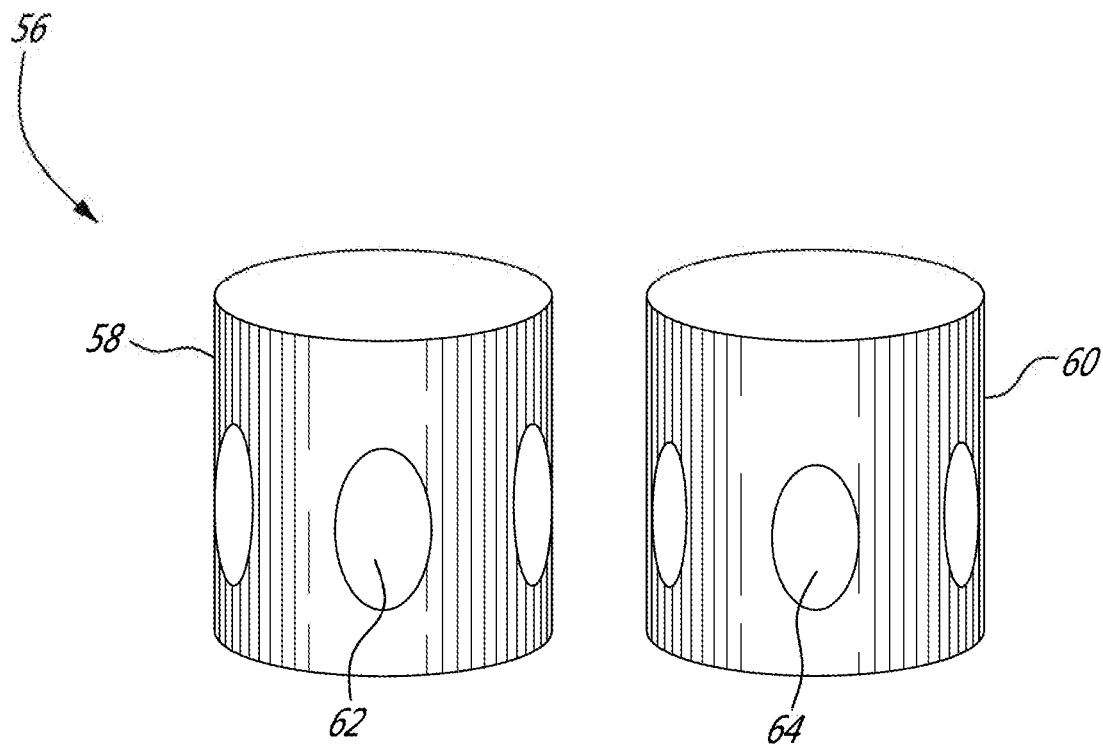
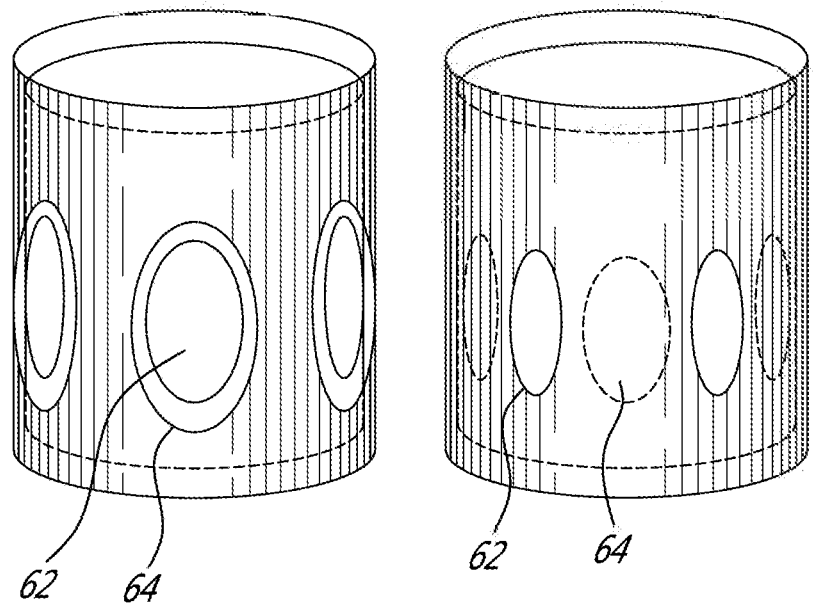
FIG. 6

METHOD AND SYSTEM FOR OPERATING A GAS TURBINE ENGINE

CROSS-REFERENCE TO RELATED APPLICATIONS

This application is a divisional of U.S. patent application Ser. No. 15/720,425 filed on Sep. 29, 2017, the entire contents of which are incorporated by reference herein in their entirety.

TECHNICAL FIELD

The present disclosure generally relates to gas turbine engines, and more particularly to operations of the gas turbine engines.

BACKGROUND OF THE ART

The designs of newer generations of gas turbine engines aim for emissions reduction. Whether the product of internal goals or environmental regulations, engines which produce low levels of various combustion by-products are becoming more desirable. However, some low emission designs may be prone to producing thermo-acoustic instabilities, sometimes referred to as "combustion instabilities", which may cause engines to exhibit loud tonal noise and increase the noise level.

The root causes of combustion instabilities are challenging to understand, as they can be the product of fuel-flow perturbations, flame thermodynamics, acoustic couplings between a combustor of the engine and various pipes and bleed ports, as well as other factors. Traditional attempts to address combustion instabilities centre around modifications to the fuel-supply or structure of the engine or the use of various add-on noise-mitigating devices. These techniques increase the weight and the complexity of the engine.

SUMMARY

In one aspect, there is provided a system for operating a gas turbine engine, the system comprising: a combustor having an outer liner; a plenum surrounding the combustor and defined between a gas generator case and the outer liner; a transfer tube having an inlet fluidly connected to the plenum and at least two outlets, a first flow passageway defined between the inlet and a first outlet of the at least two outlets, the first outlet fluidly connectable to external systems to supply compressed air to the external systems via the first flow passageway, a second flow passageway defined between the inlet and a second outlet of the at least two outlets, the second flow passageway connected to a discharge region outside of the plenum; a flow valve disposed within the second flow passageway and operable between an open position and a closed position, in the open position the flow valve fluidly connects the plenum with the discharge region, in the closed position the flow valve blocking fluid communication between the plenum and the discharge region via the second flow passageway; and a controller communicatively coupled to the flow valve to control operation thereof by: causing the flow valve to open for a time period; and subsequent to the time period, causing the flow valve to close.

The system described above may include any of the following features, in any combinations.

In some embodiments, the second flow passageway stems from the first flow passageway at a connection point located between the inlet and the first outlet.

In some embodiments, the connection point is located radially outwardly of the plenum.

In some embodiments, the flow valve is a butterfly valve having a member pivotable between two positions each corresponding to a respective one of the open and the closed position.

In some embodiments, the flow valve is a sleeve-valve including an inner sleeve and an outer sleeve surrounding the inner sleeve, the inner and outer sleeves rotatable relative to each other, the inner and outer sleeves each comprising at least one opening defined therein, in the open position the corresponding at least one opening of the inner sleeve is positioned at least partially in register with the corresponding at least one opening of the outer sleeve, and in the closed position the corresponding at least one opening of the inner sleeve is offset from the corresponding at least one opening of the outer sleeve to block the second flow passageway.

In some embodiments, the discharge region corresponds to a bypass duct of the gas turbine engine.

In some embodiments, the time period corresponds to a time period during which a rotational speed of a shaft the gas turbine engine is increasing.

In another aspect, there is provided a gas turbine engine comprising: a compressor section; a combustor section downstream of the compressor section and having a gas generator case, a combustor surrounded by the gas generator case, and a plenum defined between the combustor and the gas generator case, the plenum in fluid communication with the compressor section; a first air conduit having a first inlet fluidly connected to the plenum and a first outlet connected to an external system of the gas turbine engine to supply compressed air to the external system; a second air conduit having a second inlet fluidly connected to the plenum and a second outlet fluidly connected to a discharge region outside of the plenum; and a flow valve in fluid communication with the second air conduit, the flow valve having an open configuration in which the second inlet is fluidly connected to the second outlet through the flow valve and a closed configuration in which the second inlet is disconnected from the second outlet by the flow valve.

The gas turbine engine described above may include any of the following features, in any combinations.

In some embodiments, the second air conduit stems from the first air conduit at a connection point located between the first inlet and the first outlet.

In some embodiments, the connection point is located radially outwardly of the plenum.

In some embodiments, the flow valve is a butterfly valve having a member pivotable between two positions each corresponding to a respective one of the open and the closed position.

In some embodiments, the flow valve is a sleeve-valve including an inner sleeve and an outer sleeve surrounding the inner sleeve, the inner and outer sleeves rotatable relative to each other, the inner and outer sleeves each comprising at least one opening defined therein, in the open configuration the corresponding at least one opening of the inner sleeve is positioned at least partially in register with the corresponding at least one opening of the outer sleeve, and in the closed configuration the corresponding at least one opening of the inner sleeve is offset from the corresponding at least one opening of the outer sleeve to block the second air conduit.

In some embodiments, the discharge region corresponds to a bypass duct of the gas turbine engine.

In some embodiments, a controller is communicatively coupled to the flow valve to control operation thereof by: causing the flow valve to open for a time period; and subsequent to the time period, causing the flow valve to close.

In some embodiments, the time period corresponds to a time period during which a rotational speed of a shaft the gas turbine engine is increasing.

In yet another aspect, there is provided a method of operating a gas turbine engine having a compressor and a combustor downstream of the compressor, the combustor surrounded by a plenum, the method comprising: flowing compressed air from the compressor in the plenum; bleeding a portion of the compressed air out of the plenum and feeding the bled portion to an external system of the gas turbine engine; determining that an fuel-to-air ratio is below a given threshold; and bleeding an additional portion of the compressed air out of the plenum and into a discharge region outside of the plenum.

The method described above may include any of the following features, in any combinations.

In some embodiments, the bleeding of the portion of the compressed air includes flowing the portion of the compressed into a first air conduit connecting the plenum to the external system.

In some embodiments, the bleeding of the additional portion includes flowing the additional portion into a second air conduit stemming from the first air conduit.

In some embodiments, the bleeding of the additional portion includes pivoting a valve member of a butterfly valve between a first position in which the second air conduit is fluidly disconnected from the first air conduit into a second position in which the first air conduit is fluidly connected to the second air conduit.

In some embodiments, the bleeding of the additional portion includes rotating two perforated sleeves one relative to the other from a first relative position in which openings defined through the two perforated sleeves are offset from one another to a second relative position in which the openings are at least partially in register with one another.

DESCRIPTION OF THE DRAWINGS

Reference is now made to the accompanying figures in which:

FIG. 6 is a schematic view of the flow valve of FIG. 5 in accordance with another particular embodiment.

DETAILED DESCRIPTION

Figure 1:
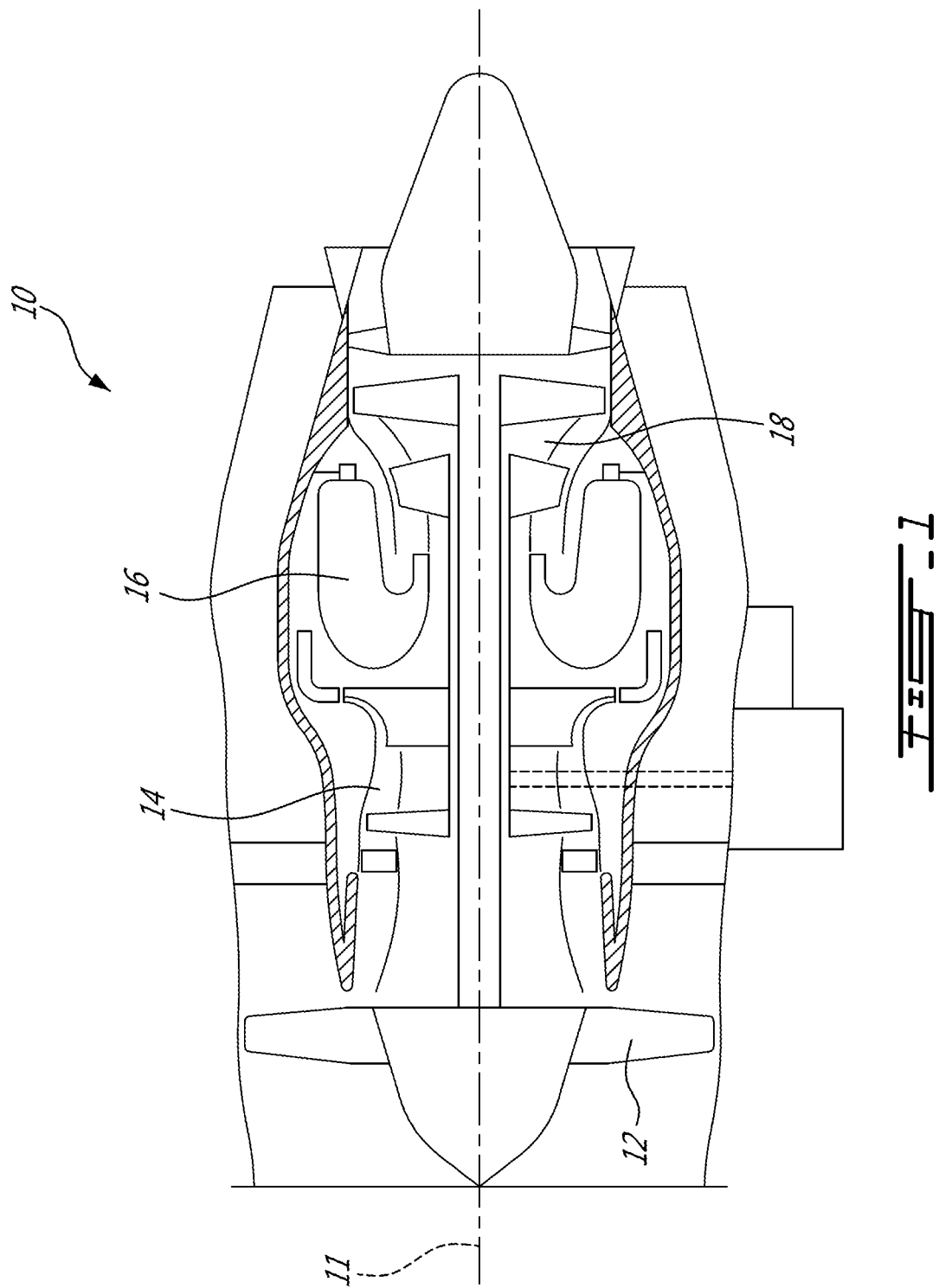
FIG. 1 is a schematic cross-sectional view of a gas turbine engine.

FIG. 1 illustrates a gas turbine engine 10 of a type preferably provided for use in subsonic flight for example, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The gas turbine engine 10 has a central axis 11 about which components such as the fan 12 and compressor rotate.

Some gas turbine engines feature combustion systems designed for low emission goals. These combustion systems may be prone to increased thermo-acoustic instabilities, commonly referred to as "combustion instabilities". For any particular combustion chamber, there normally exist limits for a fuel-to-air ratio beyond which the flame can become unstable. Unsteady heat release dynamics from the unstable flame may drive pressure oscillations within the combustion chamber which can set up undesirable aerodynamic vibration. Consequently, combustion instabilities can increase noise levels.

Low-frequency to intermediate-frequency pressure oscillations (50-600 Hz) such as those that occur during engine start-up and/or during a low-power-to-idle operating condition may increase the external combustion noise which is often referred to as "hool", "howl" or "growl", depending on the frequency or perception of the noise. In use, these instabilities are likely to appear during a ground-idle state of the engine or during low power transients. As the engine is accelerated from one thrust level to another, fuel flow to the combustor is increased while the air flow may not be able to increase accordingly. In an unstable increase of fuel flow relative to the air flow, the fuel may burn in a spontaneous explosive way. The term "ground-idle state" is intended to indicate that the aircraft is on the ground (or other surface), the aircraft is stationary (or at least moving at less than a predetermined speed), and the aircraft engines are in an idle running state. The engines may be in an idle running state when, for example, the engine throttles are positioned to a ground-idle position. It will be appreciated, however, that various other engine throttle positions could be used to indicate that the aircraft engines are in an idle running state.

Figure 2:
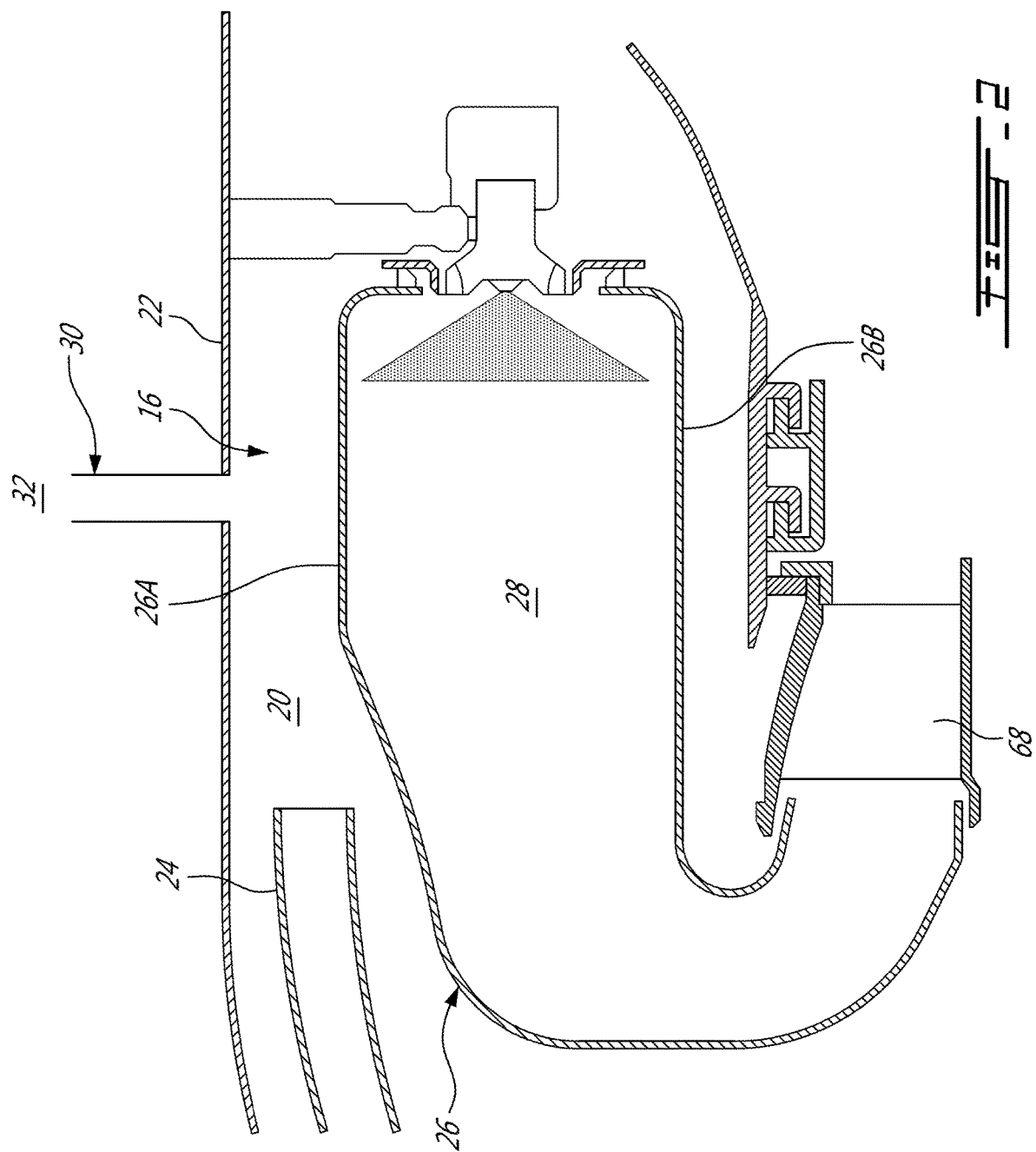
FIG. 2 is a schematic cross-sectional view of a combustor of the engine of FIG. 1.

Referring to FIG. 2, the combustor 16 is housed in a plenum 20 defined partially by a gas generator case 22 and supplied with compressed air from the compressor section 14 (FIG. 1) by a diffuser 24. Combustor 16 may generally comprise a liner 26 (shown as 26A and 26B in the figures) composed of an outer liner 26A and an inner liner 26B defining a combustion chamber 28 therein. The combustor 16 may be annular about a central axis of the engine 10. The plenum 20 is defined between the gas generator case 22 and the liner 26 of the combustor 16. A transfer tube 30 is fluidly connected to the plenum 20. The transfer tube 30 is used to direct bleed air from one location to another. For example, the transfer tube 30 is used to direct bleed air from the plenum 20 surrounding the combustor 16 to a discharge region 32 outside of the plenum 20. The discharge region 32 can be any cavity or region that is located within or outside of the engine 10.

Figure 3:
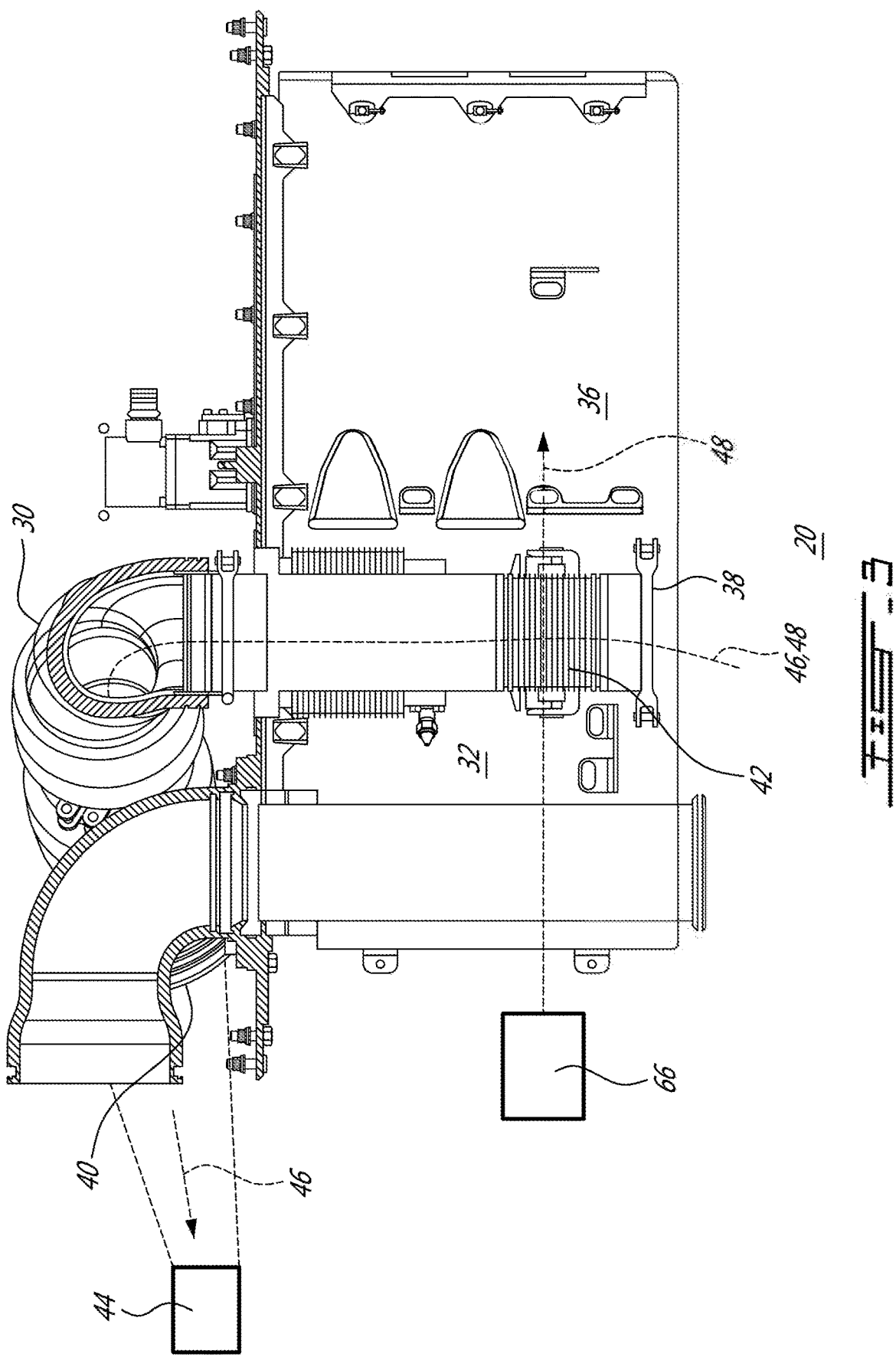
FIG. 3 is a schematic, partial cross-sectional, view of a transfer tube of the engine.

Referring to FIG. 3, in the particular embodiment shown, a transfer tube 30 extends from the plenum 20 to an outer duct structure 34. The transfer tubes 30 pass through a bypass duct 36 that is at least partially defined by the outer duct structure 34. In other embodiments, the transfer tubes 30 can be used in various other stages of bleed, for example by bleeding air from an area of the compressor section 14 upstream of the plenum 20 relative to a direction of airflow through the engine 10. In FIG. 3, the transfer tubes 30 can discharge bleed air to the bypass duct 36. The bypass duct 36 may provide an environment where the pressure and the velocity of the airflow can be controlled to a certain extend and thus bleeding the air into the bypass duct 36 can reduce the noise generation. The pressure and velocity of the discharged air may be designed relative to the airflow conditions within the bypass duct 36 for noise reduction.

Figure 4:
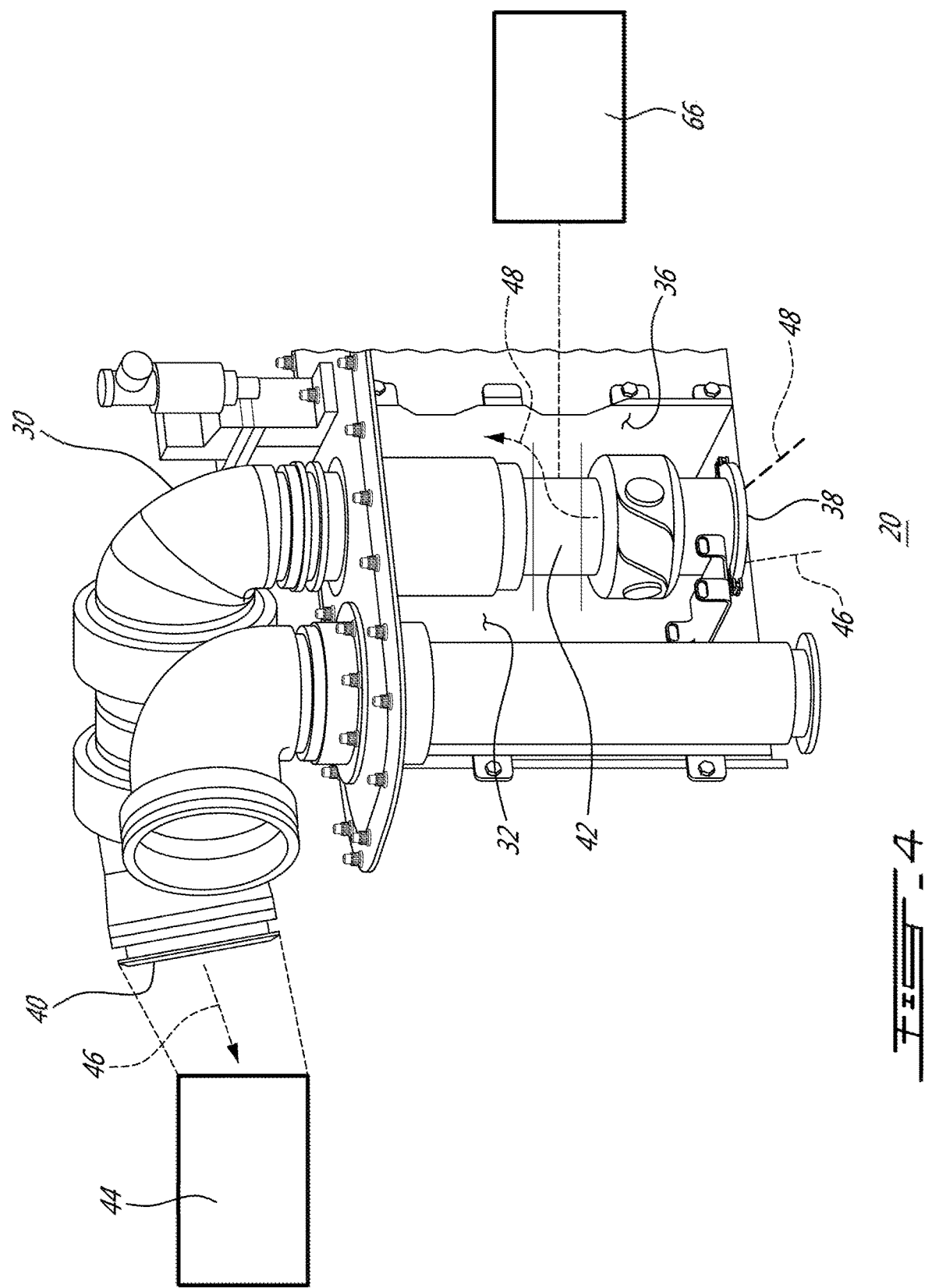
FIG. 4 is a perspective view of the transfer tube shown in FIG. 3.

Referring to FIG. 4, the transfer tube 30 has an inlet 38 fluidly connected to the plenum 20 and two outlets 40, 42 to selectively supply compressed air from the plenum 20 independently through the outlets 40, 42. The transfer tube 30 can have more than two outlets. In an alternate embodiment, the transfer tube has one outlet. In the embodiment shown, the outlet 40 is adapted to supply the compressed air from the plenum to operate external systems 44. The term "external systems" is intended to include systems that require compressed air to operate for purposes other than combustion. For example, the transfer tube 30 can be used to supply an airframe with compressed air to operate systems such as environmental control systems, cabin bleed, cabin pressurization, heating, cooling, and de-icing applications. The second outlet 42 is adapted to bleed a portion of the compressed air from the plenum 20.

A first flow passageway 46 is defined between the inlet 38 and the first outlet 40 to supply the compressed air from the plenum 20 to the external systems 44. A second flow passageway 48 is defined between the inlet 38 and the second outlet 42 to bleed compressed air from the plenum 20 to the discharge region 32 outside of the plenum 20. In the embodiment shown, the discharge region 32 is located within the bypass duct 36. Each outlet 40 and 42 of the transfer tube 30 can include a respective flow regulating device to independently control a flow of the compressed air therethrough.

Figure 5:
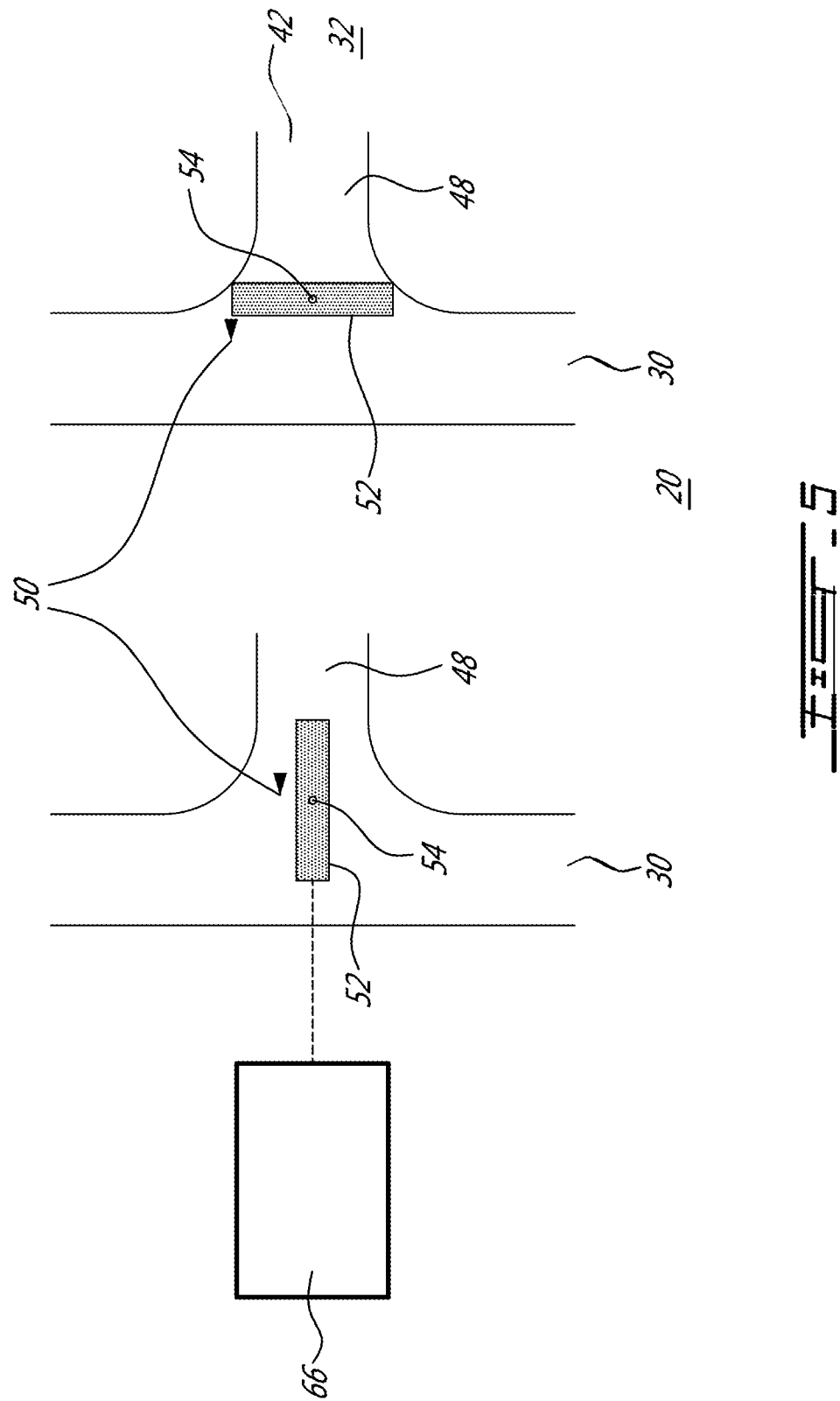
FIG. 5 is a schematic cross-sectional view of a flow valve of the engine in accordance with a particular embodiment.

Referring to FIG. 5, a flow valve 50 is disposed within the flow passageway 48. The valve 50 is shown as a butterfly valve having a rotatable disc 52 that can rotate about a point of support 54. The valve 50 can operate between an open position and a closed position. In the open position, the disc 52 is rotated to clear the flow passageway 48 and to allow the compressed air to flow from the inlet 30 to the outlet 42. In the closed position, the disc 52 is rotated to block the second flow passageway 48. The disc 52 can also rotate to a position in between the open and closed positions to regulate the flow of compressed air bleeding from the plenum 20 to the discharge region 32.

Referring to FIG. 6, the valve is shown as a sleeve-valve system 56 that includes an inner sleeve 58 and an outer sleeve 60 surrounding the inner sleeve 58. Each sleeve 58, 60 has at least one corresponding opening 62 or 64 defined therein. In the open position, the sleeves 58, 60 are rotated to place the corresponding openings 62, 64 in register relative to each other. In the closed position, the sleeves 58, 60 are rotated to displace the corresponding openings 62, 64 away from each other to block fluid access through the second flow passageway 48. The sleeves 58, 60 can also rotate to partially overlap the openings to regulate the flow of compressed air bleeding from the plenum 20 to the discharge region 32. FIGS. 5 and 6 are two examples of valves that may be used to open/close the passageway 48 and hence bleed compressed air from the plenum 20 into the discharge region 32. Numerous other types of valves may be used.

Referring back to FIGS. 4-5, a controller 66 can be provided to communicate with the flow regulating devices 50, 56, e.g. the valves, to control the operation of the flow regulating devices. The controller 66 can cause the flow valve 50 or 56 to completely open, to close and/or to partially open in order to control the flow of bleed air. The controller 66 controls the flow valves 50 or 56 to adjust the fuel-to-air ratio with a view to reducing combustion instabilities.

The controller 66 may include a system for operating the gas turbine engine 10. The system includes a processor unit and a non-transitory computer-readable program instructions that can be executed by the processing unit. The processing unit may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory may comprise any suitable known or other machine-readable storage medium. The memory may comprise non-transitory computer readable storage medium, for example, but not limited to, an electronic, magnetic, optical, electromagnetic, infrared, or semiconductor system, apparatus, or device, or any suitable combination of the foregoing. The memory may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory may comprise any storage means (e.g., devices) suitable for retrievably storing machine-readable instructions executable by processing unit.

The controller 66 can monitor inputs such as signals for receipt of an acceleration command for the engine 10 or one or more parameters that are indicative of the fuel-to-air ratio below a predetermined value. The inputs may be provided from a control system or from other sources, such as a throttle lever. The acceleration command may be received as an electrical signal, for example when the engine 10 is controlled by a fly-by-wire system, via a mechanical input, or in any other suitable way. In some embodiments, the input is a digital signal sent by a flight control system and/or a cockpit control, for example a throttle lever. The acceleration command can be any suitable indication that acceleration of the engine 10 has been requested. The signal may be received as an electrical signal to indicate that conditions of the fuel-to-air ratio below a predetermined value have been reached.

In response to receiving the acceleration command or the signal, the system generates a command to increase the fuel flow to the combustor 16. While the engine 10 accelerates, the system monitors the conditions of the engine 10 that may cause the fuel-to-air ratio to drop below a predetermined value. The predetermined value may be indicative of the limits for the fuel-to-air ratio beyond which the flame can become unstable. When the system detects the conditions or the parameters that may cause the fuel-to-air ratio to be below the predetermined value, the system bleeds the portion of compressed air from the plenum 20 away from the combustor 16 to increase the fuel-to-air ratio within the combustor 16 to at least the limit of the fuel-to-air ratio where the flame becomes stable. The conditions that may cause the fuel-to-air ratio to be below the predetermined value may be caused or may occur during the engine 10 acceleration and/or during a steady running condition of the engine 10.

In a particular embodiment, the gas turbine engine 10 can be operated by providing a fuel and compressed airflow to the combustor 16. The compressed airflow is provided from the diffuser 24 to the plenum 20 surrounding the combustor 16. In a steady thrust state, such as the ground-idle state, the rotor 68 (FIG. 2) of the compression section 14 may operate at a first rotational speed. At this speed, the combustor 16 has a given fuel-to-air ratio. For example, the fuel-to-air ratio at the steady state can be 1/15. That is, one part of fuel is provided for a corresponding fifteen parts of air. The ratio can also be represented by a mass ratio. The operation of the engine 10 also includes increasing the fuel flow to the combustor 16 to accelerate the rotor 68 of the compressor section 14 from the first rotational speed to a second rotational speed. The second rotational speed is higher than the first rotational speed. While increasing the fuel flow to the combustor, the operation of the engine 10 may include bleeding a portion of the compressed airflow to increase the fuel-to-air ratio within the combustor 16 toward a richer mixture, via the operation of the valves 50 or 56 by the controller 66. Accordingly, the pressure in the plenum 20 is reduced by operation of the valves 50 or 56 by the controller 66, to increase the fuel-to-air ratio, and thus reduce combustion instabilities. For example, the fuel-to-air ratio can be increased from 1/15 to 1/10. The bleeding may be done on P2.8 or P3.0 air, although the higher pressure of P3.0 may increase the responsiveness of the system.

The controller 66 may be programmed based on various engine operating parameters, including a rotor speed, rate of change of the rotor speed, fuel flow to the combustor 16 and the like. The controller 66 may also be connected to sensors that can determine when it is necessary to open the flow valves 50 or 56 to adjust the fuel-to-air ratio with a view to reducing combustion instabilities. In a particular embodiment, the operation of the engine 10 includes ceasing or suspending bleeding the portion of the compressed airflow when a predetermined value of the fuel-to-air ratio within the combustor 16 is reached. The predetermined value of the ratio may depend on the specific power setting of the engine 10. The predetermined value of the ratio can be specified based on the engine 10 configuration and may be determined through experimental engine tests. In an alternate embodiment, the bleeding is ceased when the rotor 68 has reached the second rotational speed.

In use, the portion of compressed airflow transferred from the plenum 20 to the discharge region 32 through the transfer tube 30 reduces the quantity of available compressed air that can be directed to the combustor 16 for combustion. Consequently, the fuel-to-ratio within the combustor 16 can be increased. In a particular embodiment, 2% to 8% of the compressed airflow may be discharged from the plenum 20. In another particular embodiment, a least amount of compressed air relative to the fuel flow is provided to prevent engine flame-out.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A system for operating a gas turbine engine, the system comprising:
   a combustor having an outer liner;
   a plenum surrounding the combustor and defined between a gas generator case and the outer liner;
   a transfer tube having an inlet fluidly connected to the plenum and at least two outlets, a first flow passageway defined between the inlet and a first outlet of the at least two outlets, the first outlet fluidly connectable to external systems to supply compressed air to the external systems via the first flow passageway, a second flow passageway defined between the inlet and a second outlet of the at least two outlets, the second flow passageway connected to a discharge region outside of the plenum;
   a flow valve disposed within the second flow passageway and operable between an open position and a closed position, in the open position the flow valve fluidly connects the plenum with the discharge region, in the closed position the flow valve blocking fluid communication between the plenum and the discharge region via the second flow passageway; and
   a controller communicatively coupled to the flow valve to control operation thereof by:
      causing the flow valve to open for a time period; and
      subsequent to the time period, causing the flow valve to close.

2. The system of claim 1, wherein the second flow passageway stems from the first flow passageway at a connection point located between the inlet and the first outlet.

3. The system of claim 2, wherein the connection point is located radially outwardly of the plenum.

4. The system of claim 1, wherein the flow valve is a butterfly valve having a member pivotable between two positions each corresponding to a respective one of the open and the closed position.

5. The system of claim 1, wherein the flow valve is a sleeve-valve including an inner sleeve and an outer sleeve surrounding the inner sleeve, the inner and outer sleeves rotatable relative to each other, the inner and outer sleeves each comprising at least one opening defined therein, in the open position the corresponding at least one opening of the inner sleeve is positioned at least partially in register with the corresponding at least one opening of the outer sleeve, and in the closed position the corresponding at least one opening of the inner sleeve is offset from the corresponding at least one opening of the outer sleeve to block the second flow passageway.

6. The system as defined in claim 1, wherein the discharge region corresponds to a bypass duct of the gas turbine engine.

7. The system of claim 1, wherein the time period corresponds to a time period during which a rotational speed of a shaft the gas turbine engine is increasing.

8. A gas turbine engine comprising:
   a compressor section;
   a combustor section downstream of the compressor section and having a gas generator case, a combustor surrounded by the gas generator case, and a plenum defined between the combustor and the gas generator case, the plenum in fluid communication with the compressor section;
   a first air conduit having a first inlet fluidly connected to the plenum and a first outlet connected to an external system of the gas turbine engine to supply compressed air to the external system;
   a second air conduit having a second inlet fluidly connected to the plenum and a second outlet fluidly connected to a discharge region outside of the plenum; and
   a flow valve in fluid communication with the second air conduit, the flow valve having an open configuration in which the second inlet is fluidly connected to the second outlet through the flow valve and a closed configuration in which the second inlet is disconnected from the second outlet by the flow valve.

9. The gas turbine engine of claim 8, wherein the second air conduit stems from the first air conduit at a connection point located between the first inlet and the first outlet.

10. The gas turbine engine of claim 9, wherein the connection point is located radially outwardly of the plenum.

11. The gas turbine engine of claim 8, wherein the flow valve is a butterfly valve having a member pivotable between two positions each corresponding to a respective one of the open and the closed position.

12. The gas turbine engine of claim 8, wherein the flow valve is a sleeve-valve including an inner sleeve and an outer sleeve surrounding the inner sleeve, the inner and outer sleeves rotatable relative to each other, the inner and outer sleeves each comprising at least one opening defined therein, in the open configuration the corresponding at least one opening of the inner sleeve is positioned at least partially in register with the corresponding at least one opening of the outer sleeve, and in the closed configuration the corresponding at least one opening of the inner sleeve is offset from the corresponding at least one opening of the outer sleeve to block the second air conduit.

13. The gas turbine engine as defined in claim 8, wherein the discharge region corresponds to a bypass duct of the gas turbine engine.

14. The gas turbine engine of claim 8, comprising a controller communicatively coupled to the flow valve to control operation thereof by:
   causing the flow valve to open for a time period; and
   subsequent to the time period, causing the flow valve to close.

15. The gas turbine engine of claim 14, wherein the time period corresponds to a time period during which a rotational speed of a shaft the gas turbine engine is increasing.

16. A method of operating a gas turbine engine having a compressor and a combustor downstream of the compressor, the combustor surrounded by a plenum, the method comprising:
   flowing compressed air from the compressor in the plenum;
   bleeding a portion of the compressed air out of the plenum and feeding the bled portion to an external system of the gas turbine engine via a first flow passageway leading to a first outlet fluidly connected to the external system;
   determining that a fuel-to-air ratio is below a given threshold; and
   bleeding an additional portion of the compressed air out of the plenum and into a discharge region outside of the plenum via a second flow passageway leading to a second outlet fluidly connected to the discharge region.

17. The method of claim 16, wherein the bleeding of the portion of the compressed air includes flowing the portion of the compressed into a first air conduit connecting the plenum to the external system.

18. The method of claim 17, wherein the bleeding of the additional portion includes flowing the additional portion into a second air conduit stemming from the first air conduit.

19. The method of claim 18, wherein the bleeding of the additional portion includes pivoting a valve member of a butterfly valve between a first position in which the second air conduit is fluidly disconnected from the first air conduit into a second position in which the first air conduit is fluidly connected to the second air conduit.

20. The method of claim 18, wherein the bleeding of the additional portion includes rotating two perforated sleeves one relative to the other from a first relative position in which openings defined through the two perforated sleeves are offset from one another to a second relative position in which the openings are at least partially in register with one another.

* * * * *